United States Patent [19]

Howe

[11] 4,179,007

[45] Dec. 18, 1979

[54] WIND OPERATED POWER GENERATING APPARATUS

[76] Inventor: Robert R. Howe, 4229 Timber Valley Ct., Decatur, Ga. 30032

[21] Appl. No.: 911,464

[22] Filed: Jun. 1, 1978

[51] Int. Cl.² ............................................. B60L 11/00
[52] U.S. Cl. ................................. 180/65 DD; 290/55
[58] Field of Search ...................... 180/65 DD, 65 R; 290/44, 55

[56] References Cited

U.S. PATENT DOCUMENTS

| | | | |
|---|---|---|---|
| 1,531,370 | 3/1925 | Beavers | 290/55 |
| 3,713,503 | 1/1973 | Haan | 180/65 DD |
| 3,721,290 | 3/1973 | Butler, Jr. | 290/44 |
| 3,876,925 | 4/1975 | Stoeckert | 180/65 DD |
| 3,878,913 | 4/1975 | Lionts | 180/65 DD |
| 4,039,849 | 8/1977 | Mater | 290/44 |
| 4,047,833 | 9/1977 | Decker | 290/55 |
| 4,086,498 | 4/1978 | Szoeke | 290/55 |

*Primary Examiner*—David M. Mitchell
*Attorney, Agent, or Firm*—Jones, Thomas & Askew

[57] ABSTRACT

A wind operated electrical power generating device mounted on a self-propelled vehicle comprises a wind rotated rotor mounted on a flywheel and at least one generator which is powered by the rotating flywheel. The operative connection between the generator and flywheel, in the preferred embodiment, comprises a wheel mounted on the generator shaft and tracking within a continuous grooved channel formed in the inner or outer periphery of the flywheel.

15 Claims, 5 Drawing Figures

WIND OPERATED POWER GENERATING APPARATUS

BACKGROUND OF THE INVENTION

The present invention relates to a wind operated electrical power generating device, which device is mounted on the exterior of a car and which uses the wind resulting from the motion of the car to produce electricity for use by the car.

Relative wind has been used in the past in conjunction with moving vehicles to turn propellers, air turbines, treadmills or rotors, which, in turn, are connected by various means, to a generator. Generally, the connection between the wind rotated element and the generator is by pulleys and belts. For example, U.S. Pat. Nos. 1,423,514, Butusov, 3,374,849, Redman, and 3,713,503, Haan teach the use of rotary elements mounted on moving vehicles and connected to electric generators by belts and pulleys for developing electricity for use by the vehicle. U.S. Pat. No. 4,039,849, Mater, teaches the use of a wind element rotatable about a vertical axis and does not use belts or pulleys to connect to a generator but the rotor engages a flywheel which acts as a generator rotor.

SUMMARY OF THE INVENTION

Briefly described, the present invention comprises an electrical power generating device for use on a moving vehicle and which uses a wind rotated element fixedly combined with a flywheel to turn conventional generator units without the use of pulleys and belts.

The wind rotated element rotates in a plane parallel to the wind flow and is, therefore, capable of rotation in a horizontal plane about a vertical axis so as to be easily mounted on the roof of a vehicle and so as to offer a minimum of wind resistance. The wind rotated rotor of the present invention is mounted permanently to a flywheel which, in the preferred embodiment, is formed with a continuous grooved channel about its circumference.

The generators employed by the present invention are conventional, independent units. The rotating shaft of each generator is equipped with a contacting wheel designed to be compatible with the grooved channel in the flywheel. In this way, the generators make direct contact with the flywheel and are rotated in direct response to the rotation of the wind rotated rotor without the use of pulleys and belts.

In operation, the electric generators do not engage the flywheel when the automobile is moving at a low speed. As the vehicles speed increases, the rotor and flywheel rotate at sufficient speed that the generators can then be moved into engagement.

Thus it can be seen that the present invention provides an auxiliary generating means for supplying electricity to be used by an automobile, particularly suitable to charge a battery. Such invention would be particularly useful in combination with an electric car to charge the battery of the car.

It is, therefore, an object of the present invention to provide a wind operated electric power system which can power conventional generator units without the use of pulleys and belts.

Another object of the present invention is to provide a wind operated electric power system which can be mounted to a vehicle and which will occupy a minimum of space and offer a minimum of wind resistance.

These and other objects and advantages of the present invention will become apparent from reference to the following description, attached drawings and claims.

DETAILED DESCRIPTION OF THE DRAWINGS

Figure 1:
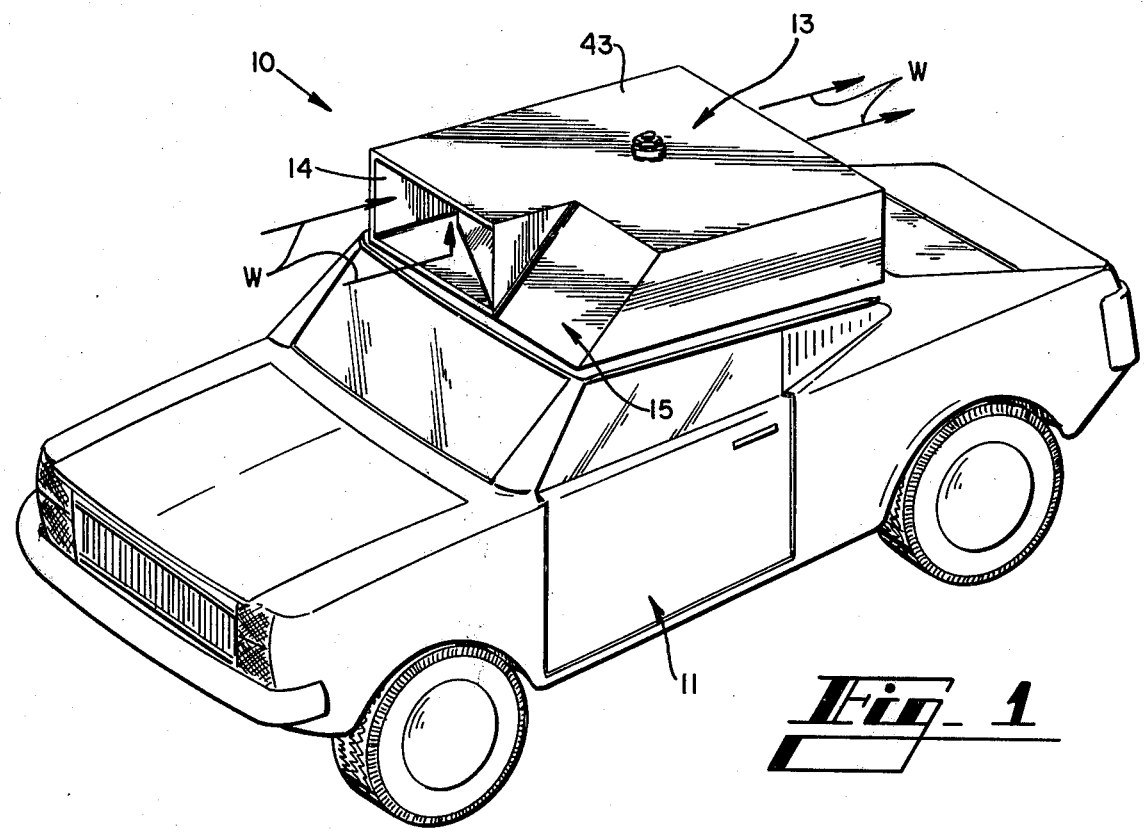
FIG. 1 is a perspective view of the wind operated electrical power system in use in accordance with the present invention.

Referring now to the drawings in which like numerals represent like components throughout the various views, FIG. 1 shows the wind operated electrical power device 10 of the present invention as it is mounted on the roof of a car 11. The device comprises a housing 13 which is of a generally rectangular box shape. The housing wall which faces oncoming relative wind W includes an air scoop section 14 which captures the wind W and directs the wind into the housing 13. The portion 15 of the wind-facing wall that does not form a part of the wind scoop 14 is slanted rearward away from the vertical so as to minimize the wind resistance offered by the device 10. The rear side (not shown) of the housing 13, being that side opposite the wind-facing, air scoop section 14, is completely open so as to let the relative wind W out of the housing 13.

Figure 2:
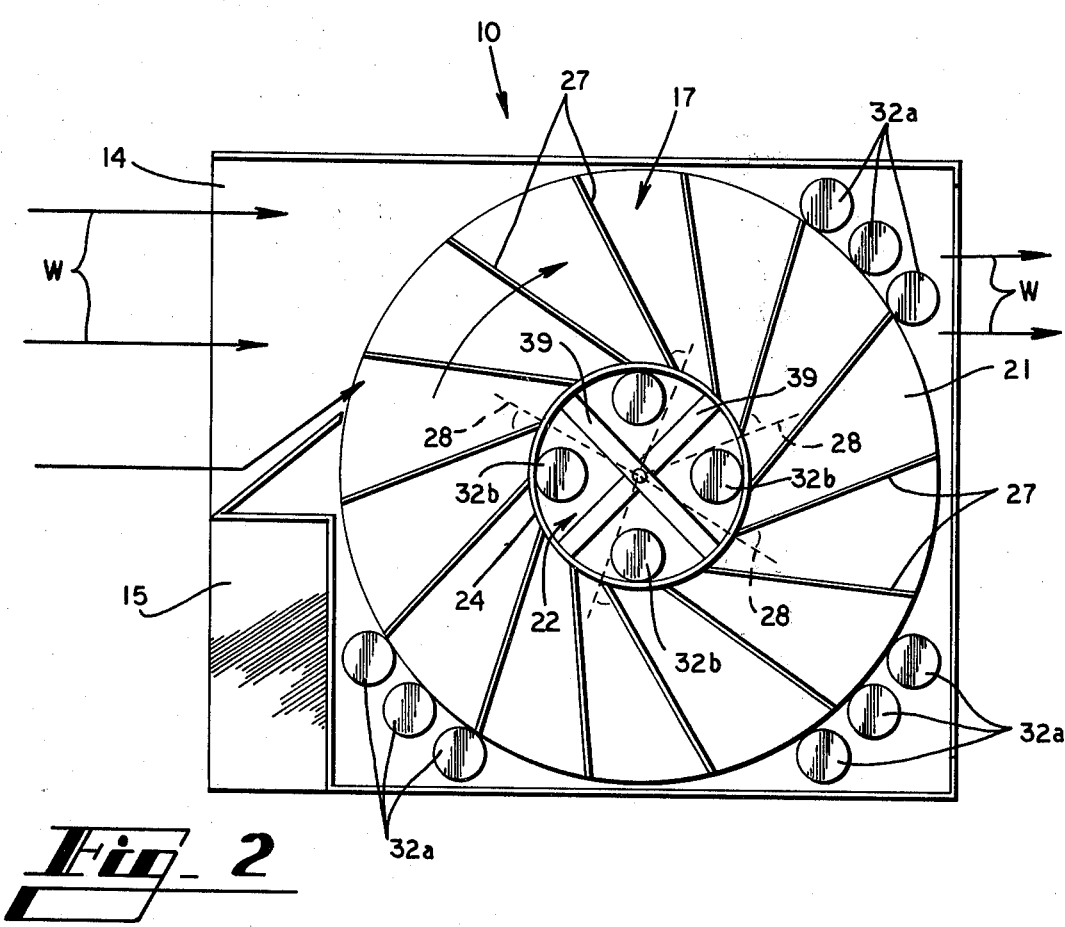
FIG. 2 is a cut-away top view of the invention in FIG. 1.
Figure 3:
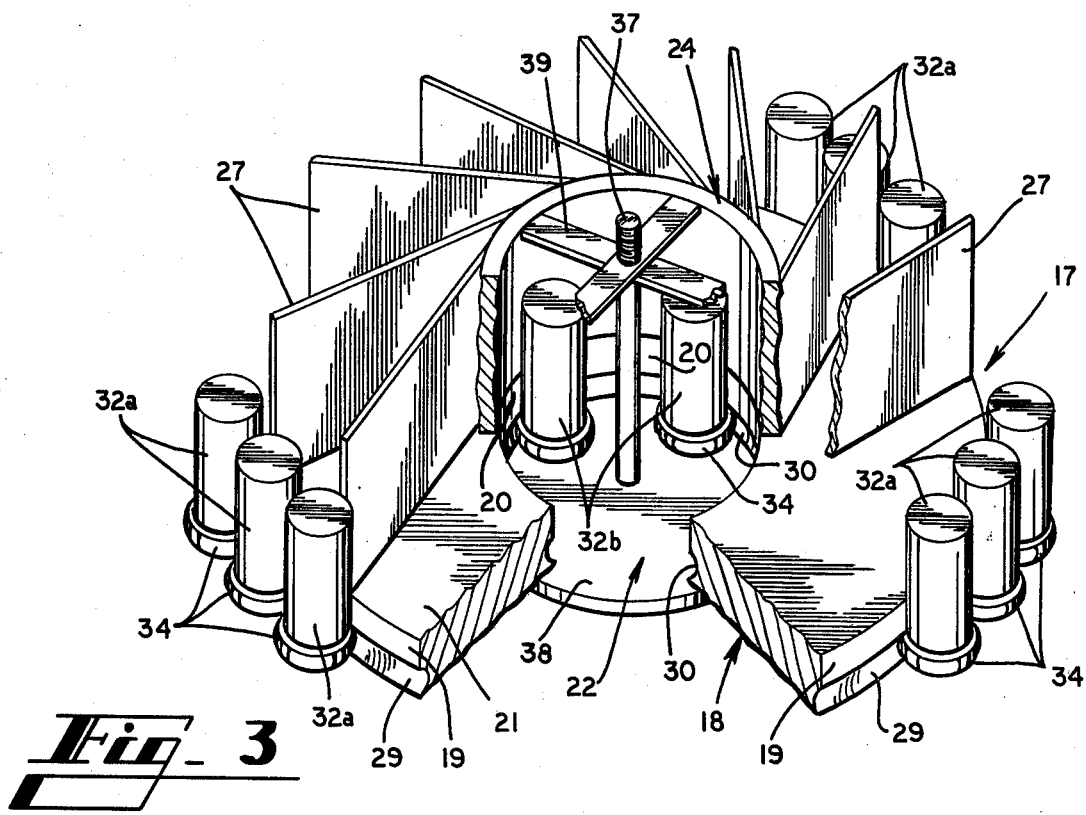
FIG. 3 is a broken, perspective view of the flywheel and rotor blades in accordance with the present invention.

A flywheel assembly 17, as seen in FIGS. 2 and 3, is housed within the housing 13. The flywheel assembly 17 comprises a circular plate or flywheel 18 defining an outer annular rim 19 and an inner annular rim 20 which defines a central opening 22 centrally located in the circular plate 18. A raised cylindrical core 24 extends the central opening 22 perpendicular to the circular plate 18 and above the top surface 21 of the circular plate 18.

Rigidly mounted on the top surface 21 of the circular plate or flywheel 18 are a plurality of rotor or impeller blades 27, each of which defines a plane perpendicular to the plane of the circular plate 18. The rotor blades 27 emanate outward from the raised cylindrical core 24 and are all angled, in like manner, away from the radius (shown by dotted line 28). An annular track 29, which is shown in the preferred embodiment as a grooved channel 29, is formed in the outer circumferential rim 19 and a similar grooved channel 30 is formed in the inner circumferential rim of the flywheel 18. A number of generators 32 are positioned at various locations about the periphery of flywheel assembly 17 or within the central opening 22. The number and positioning of generators 32 is a matter of design choice. In the present embodiment, generators 32a have been located about the periphery of the flywheel assembly 17 in each of three corners of the housing 13 in order to make efficient use of available space. Four inner generators 32b have been located within the cylindrical core 24 and central opening 22. Each generator includes a generator shaft 33 and attached to the shaft 33 of each generator 32 is a gear member 34 which in the preferred embodiment is a rubber contacting wheel 34 which is designed so as to be compatible with the grooved channels 29, 30 of the inner and outer rims 19, 20.

Figure 4:
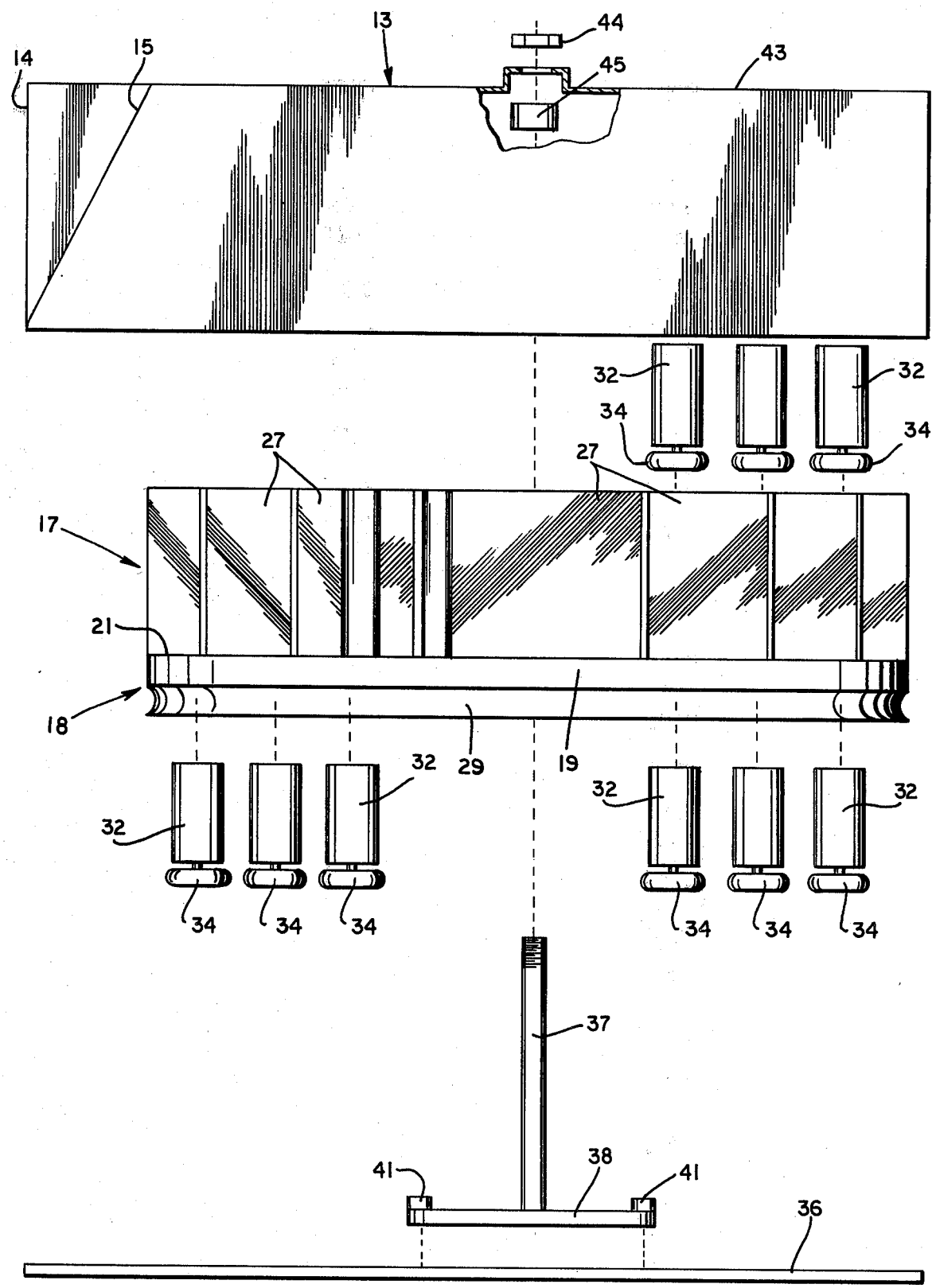
FIG. 4 is an exploded side view of the invention in FIG. 1.

Looking now to FIG. 4, the assembly of the system is disclosed. A weather pan or base plate 36 attaches to and covers the roof of car 11. Bolted or welded to the base plate 36 is an anchor post 37 and anchor plate 38. The flywheel assembly 17 with attached rotor blades 27 is placed over the base plate 36 with the anchor post 37 extending through the central opening 22 and through the crossed spokes 39 (see FIGS. 2 and 3) mounted to the cylindrical core 24. The flywheel assembly 17 rests on bearings 41 for ease of rotation. The hood or housing 13, having four sides, including the air scoop 14 and slanted portion 15, the open rear side (not shown) and a top plate 43, fits over all the previously mentioned components and is held with a nut 44 to the anchor post 37. A bearing 45 acts as a spacer between the crossed spokes 39 and the top plate 43 of the hood 13.

Figure 5:
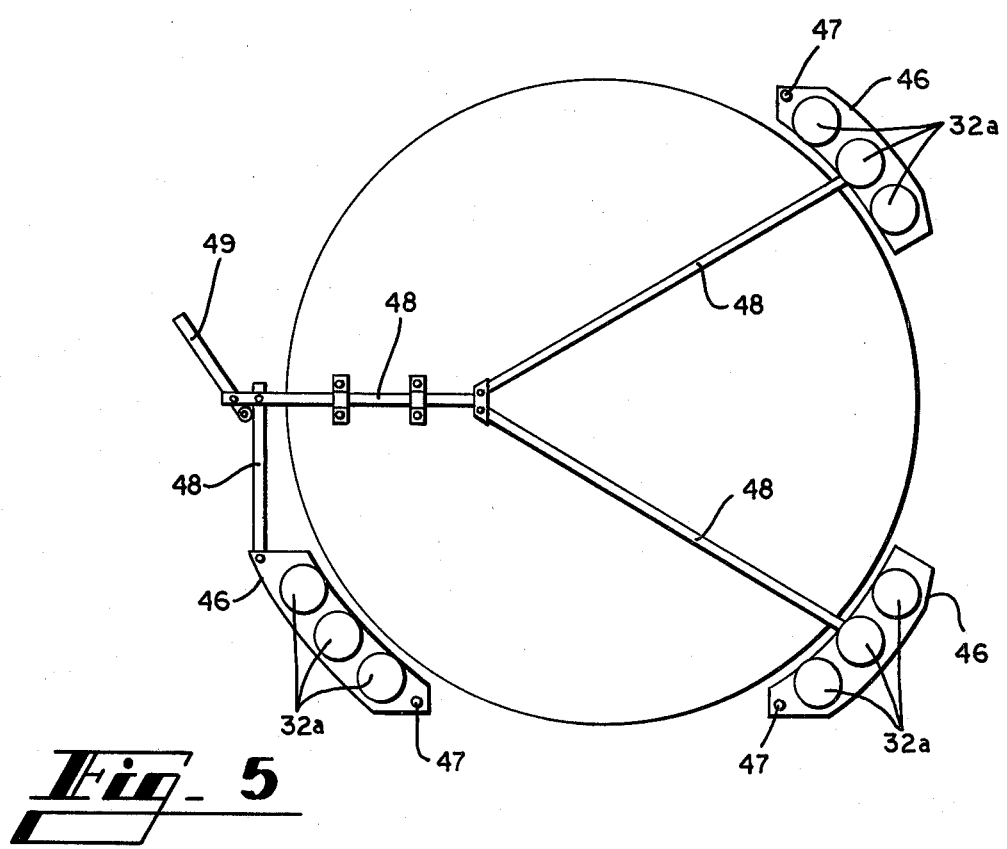
FIG. 5 is a top view of the engaging-disengaging device of the invention of FIG. 1.

The nine outer generators 32a are mounted, within the housing 13 in groups of three, to mounting plates 46 (see FIG. 5) which pivot about pivot pins 47. Mounting plates 46 are attached to tie rods 48 which may be actuated by lever 49. This provides a manual engaging and disengaging device whereby moving the lever 49 downward will cause mounting plates 46 to move inwardly toward the center of the flywheel assembly 17 and thereby cause the contact wheels 34 of the generators 32 to engage the grooved channel 29. The four inner generators 32b are, in the disclosed embodiment, permanently mounted to the base plate 36 and anchor plate 38 with the contact wheels 34 in constant engagement with the inner grooved channel 30. It is envisioned that these inner generators 32b could also be movably mounted for selective disengagement.

In operation, the outer generators 32a are not engaged by the flywheel assembly 17 when the automobile is moving at slow speeds. As the vehicle's speed increases, air is forced into the air scoop 14, where the air contacts the rotor blades 27 and turns the attached flywheel 18. When the flywheel 18 is turning at sufficient speed, the outer generators 32a are placed into operation by moving the lever 49 of the engaging-disengaging device. The rotation of flywheel 18 is thereby selectively transferred to outer generators 32a by the tracking of contact wheels 34 in the outer grooved channel 29.

In an alternative embodiment of the present invention, grooved channels 29, 30 and contact wheels 34 are replaced by interacting tooth gears. The annular track 29, 30 being the larger driving gear and the gear member 34 being a smaller driven sprocket or gear attached to the generator shaft and meshing with the track.

While this invention has been described in detail with particular reference to preferred embodiments thereof, it will be understood that variations and modifications can be effected within the spirit and scope of the invention as described hereinbefore and as defined in the appended claims.

What is claimed is:

1. In combination, a self propelled vehicle and a wind operated electrical power system mounted on said self propelled vehicle, said power system comprising:
    a flywheel including an inner and an outer circumferential rim, said inner and outer rims being concentric and at least one of said circumferential rims comprising an annular track portion;
    a plurality of rotor vanes mounted on said flywheel, said vanes arranged such that wind striking said vanes urges rotation of said flywheel about an axis perpendicular to the direction of flow of the wind; and
    at least one electric generator including a generator shaft and a wheel mounted to said generator shaft, said generator being positioned with said wheel in direct rotating engagement with said annular track portion,
    whereby said wheel tracks on said track portion and tracking of said wheel on said track portion rotates said generator shaft in response to rotation of said flywheel.

2. The electrical power system of claim 1 and wherein said annular track portion comprises a grooved channel and said grooved channel is defined at the outer perimeter of said outer circumferential rim and said electric generator is positioned at the outer priphery of said flywheel with said wheel engaging said grooved channel.

3. The electrical power system of claim 1 and wherein said annular track portion comprises a grooved channel and said grooved channel is defined at the inner perimeter of said inner circumferential rim and said electric generator is positioned near the center of said flywheel.

4. The electrical power system of claim 1 and further including means for selectively moving said wheel of said generator into and out of engagement with said annular track portion of said flywheel.

5. In combination, a self propelled vehicle and an electrical power system comprising a flywheel mounted on top of said vehicle and rotatable about a vertical axis, a fan assembly mounted on and rotatable with said flywheel, said fan assembly comprising a plurality of fan blades oriented in an annular array about said vertical axis and each in a plane approximately parallel to said vertical axis and defining at their inner edges a cylindrical core, at least one electric generator including a generator shaft, a gear member mounted on said generator shaft, means for moving said generator toward and away from said flywheel to place said gear member into and out of direct driving relationship with said flywheel.

6. The combination of claim 5 and wherein said flywheel defines a central opening aligned with said cylindrical core of said fan assembly, and wherein said electric generator is positioned in the aligned central opening and cylindrical core of said flywheel and said fan assembly.

7. The electrical power system of claim 5 and further including:
    a housing for encasing said flywheel and said generator therein, said housing including an air scoop for directing the flow of air into said housing and into contact with said rotor blades and an open side opposite said air scoop for letting the flow of air out of said housing.

8. A wind operated electrical power system for use with a self propelled vehicle comprising:
    a rotatable flywheel including an inner and an outer circumferential rim, said inner and outer rims being concentric and at least one of said circumferential rims comprising an annular track portion;

a plurality of rotor vanes mounted on and rotatable with said flywheel, said vanes arranged such that wind striking said vanes urges rotation of said flywheel about an axis perpendicular to the direction of flow of the wind; and at least one electric generator including a generator shaft and a wheel member mounted to said generator shaft, said wheel member being in direct rotating engagement with said track portion of said circumferential rim and oriented in a plane approximately parallel to a plane defined by said flywheel, and said generator shaft being oriented approximately parallel to said axis perpendicular to the direction of flow of the wind;

whereby said wheel member tracks on said track portion and tracking of said wheel on said track portion rotates said generator shaft in response to rotation of said flywheel.

9. The power system of claim 8 and wherein said wheel member comprises a tooth gear and said annular track comprises gear teeth in operative rotational engagement with the teeth of said tooth gear.

10. Electrical power system of claim 8, wherein said annular track portion comprises a grooved channel and said wheel member extends into and engages said grooved channel.

11. The electrical power system of claim 10 and wherein said grooved channel is defined at the outer perimeter of said outer circumferential rim and said electric generator is positioned at the outer periphery of said flywheel.

12. The electrical power system of claim 10 and wherein said grooved channel is defined at the inner perimeter of said inner circumferential rim and said electric generator is positioned near the center of said flywheel.

13. The electrical power system of claim 8 and further including means for selectively moving said wheel of said generator into and out of engagement with said annular track portion of said flywheel.

14. The electrical power system of claim 8 and further including:
a housing for encasing said flywheel, said rotor vanes and said generator therein, said housing including an air scoop for directing the flow of air into said housing and into contact with said rotor blades and an open side opposite said air scoop for letting the flow of air out of said housing.

15. The electrical power system of claim 8 wherein said inner and outer rims define a surface therebetween over which said rotor vanes are mounted, said rotor vanes extending perpendicular to said surface.

* * * * *